(12) United States Patent
Chen (10) Patent No.: US 9,414,189 B2
(45) Date of Patent: Aug. 9, 2016

(54) METHOD OF LOCATING A MOBILE DEVICE AND MOBILE DEVICE UTILIZING THE SAME

(71) Applicant: AthenTek Inc., Taipei (TW)

(72) Inventor: Chun-Nan Chen, Taipei (TW)

(73) Assignee: AthenTek Incorporated, Taipei (TW)

( * ) Notice: Subject to any disclaimer, the term of this patent is extended or adjusted under 35 U.S.C. 154(b) by 0 days.

(21) Appl. No.: 14/498,780

(22) Filed: Sep. 26, 2014

(65) Prior Publication Data
US 2016/0007146 A1 Jan. 7, 2016

Related U.S. Application Data

(60) Provisional application No. 62/019,829, filed on Jul. 1, 2014.

(51) Int. Cl.
*H04W 4/02* (2009.01)

(52) U.S. Cl.
CPC ...................................... *H04W 4/02* (2013.01)

(58) Field of Classification Search
CPC ........................................................ H04W 4/02
See application file for complete search history.

(56) References Cited

U.S. PATENT DOCUMENTS

| | | | |
|---|---|---|---|
| 2002/0177449 A1* | 11/2002 | McDonnell et al. | 455/456 |
| 2005/0043050 A1* | 2/2005 | Lee | H04W 72/005 455/515 |
| 2011/0244887 A1* | 10/2011 | Dupray et al. | 455/456.2 |
| 2012/0191512 A1* | 7/2012 | Wuoti et al. | 705/14.1 |
| 2014/0074399 A1* | 3/2014 | Kelly | 701/522 |

* cited by examiner

*Primary Examiner* — Marcos Torres (57) ABSTRACT

A method of locating a mobile device and the mobile device utilizing the same are provided. The method, adopted by a mobile device, includes: scanning for a first signal of a first signal source in a vicinity of a first location to obtain first signal source information; receiving a logging request to log the first location; and upon receiving the logging request, recording a first location identifier and the first signal source information in a location log, wherein the first location identifier represents the first location.

8 Claims, 5 Drawing Sheets

METHOD OF LOCATING A MOBILE DEVICE AND MOBILE DEVICE UTILIZING THE SAME

CROSS REFERENCE TO RELATED APPLICATIONS

This application claims priority of U.S. Provisional Application No. 62/019,829, filed on Jul. 1, 2014, and the entirety of which is incorporated by reference herein.

BACKGROUND OF THE INVENTION

1. Field of the Invention

The present invention relates to location-based services, and in particular relates to a method of locating a mobile device and the mobile device utilizing the same.

2. Description of the Related Art

Mobile phones nowadays can determine their geographic location by navigation signals from a satellite system (e.g., global positioning system or GPS) or an assistant navigation system (e.g., Assistant GPS or AGPS) and then connect to a remote location server to provide location-based services (LBS) based on the geographic location. LBS include services to identify a location of a person or object, such as tracking friends' or children's location and advertising directed at consumers based on their current location.

While providing convenience, LBS causes the LBS-enabled mobile phones to be tracked, even in real-time. Therefore, LBS privacy issues arise, and a method and a mobile device are provided to identify the current location while preserving privacy in LBS.

BRIEF SUMMARY OF THE INVENTION

A detailed description is given in the following embodiments with reference to the accompanying drawings.

An embodiment of a method is described, adopted by a mobile device, including scanning for a first signal of a first signal source in a vicinity of a first location to obtain first signal source information; receiving a logging request to log the first location; and upon receiving the logging request, recording a first location identifier and the first signal source information in a location log, wherein the first location identifier represents the first location.

Another embodiment of a mobile device is disclosed, including a scanning circuit, a logging circuit and a memory. When the scanning circuit is configured to scan for a first signal of a first signal source in a vicinity of a first location to obtain first signal source information. The logging circuit is configured to receive a logging request to log the first location, and upon receiving the logging request, record a first location identifier and the first signal source information in a location log, wherein the first location identifier represents the first location. The memory is configured to store the location log.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Various aspects are described herein in connection with a mobile device, which can also be referred to as a mobile station, system, device, wireless terminal, subscriber unit, subscriber station, mobile, remote station, remote terminal, access terminal, user terminal, terminal, communication device, wireless device, portable communication device, wireless communication device, user agent, user device, or user equipment (UE). The mobile device may be a cellular telephone, a smartphone, a pager, a media player, a gaming console, a Session Initiation Protocol (SIP) phone, Personal Digital Assistant (PDA), a tablet computer, a laptop computer, a handheld device having wireless connection capability, a computing device, or any processing device connected to a wireless modem.

In the present application, embodiments of the invention are described primarily in the context of a smartphone. However, it will be appreciated that the invention is not intended to be limited to the context of a smartphone and may relate to any type of appropriate mobile device.

A signal source described herein is a wireless transmitter, including a Bluetooth dongle, a Wireless Fidelity (WiFi) Access Point (AP), or a small cell AP such as a femtocell or a picocell AP.

Figure 1:
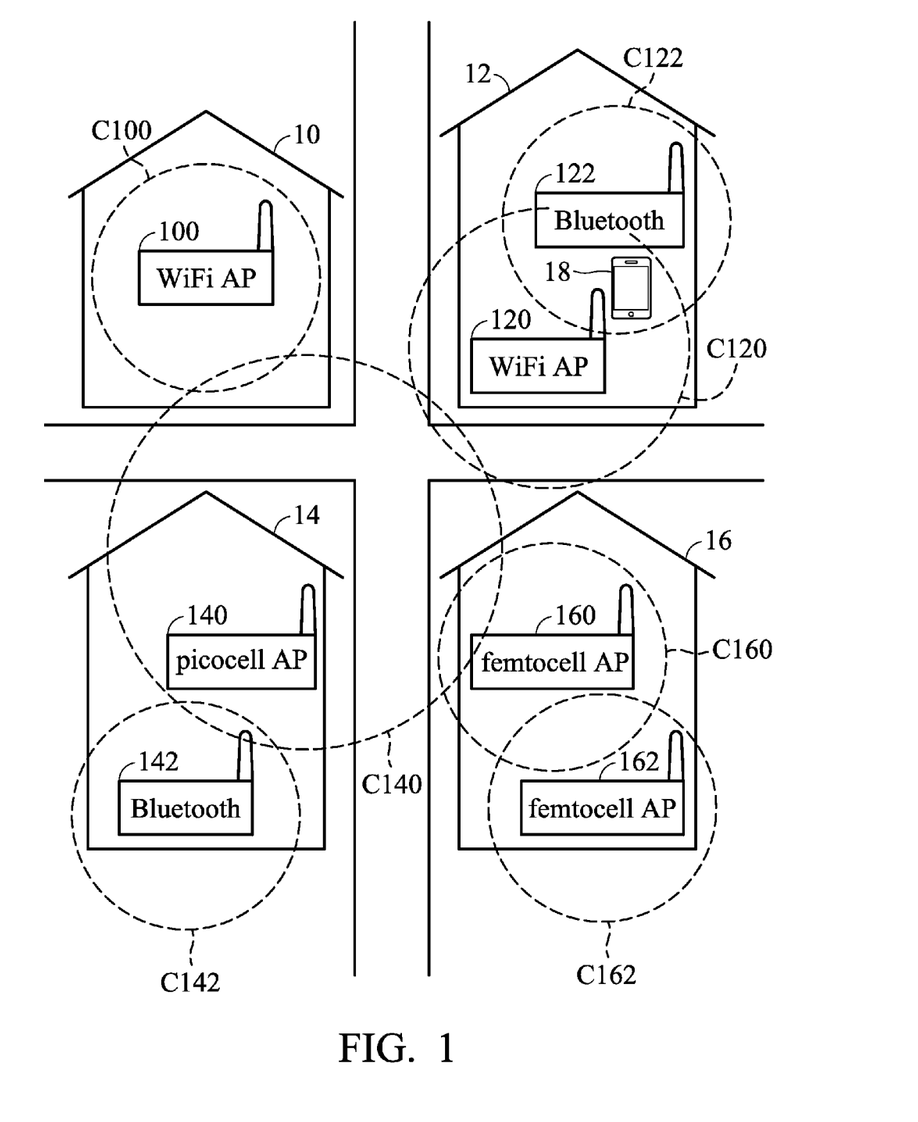
FIG. 1 is a schematic diagram illustrating locating operations of a smartphone 18 according to an embodiment of the invention.

FIG. 1 is a schematic diagram illustrating a street environment of a road intersection according to an embodiment of the invention, including 4 buildings 10 through 16 on street blocks; each building contains one or more short-ranged wireless transmitters with a range less than a few kilometers. Specifically, the building 10 contains a WiFi AP 100 providing the radio coverage C100, the building 12 contains a WiFi AP 120 providing the radio coverage C120 and a Bluetooth device 122 providing the radio coverage C122, the building 14 contains a picocell AP 140 providing the radio coverage C140 and a Bluetooth device 142 providing the radio coverage C142, and the building 16 contains a femtocell AP 160 providing the radio coverage C160 and a femtocell AP 162 providing the radio coverage C162. The coverage of the picocell may be up to 200 meters, the coverage of the femtocell may be up to 10 meters, the coverage of the WiFi AP may be up to 60 meters, and the coverage of the Bluetooth device may be up to 20 meters. It is to be understood that embodiments of the present invention can be used in any environment, including but not limited to a street environment, a home environment, an office environment, and a store environment.

When a person carries a smartphone 18 on the street, it may be desirable to identify a location of the person or the smartphone 18 and perform a location-based application on the smartphone 18. In the present embodiment, the smartphone 18 can periodically scan for WiFi, Bluetooth and other radio sources in the range on Android, iOS, or another mobile platform, and the location where the mobile device 18 is current in can be identified by the detected signal sources.

Accordingly, the radio coverage of each building is provided by one or more short-ranged signal sources. As a consequence, when the smartphone 18 enters a certain area of the street, e.g., a store, it can detect specific signal sources which provide the radio coverage to the area. The detected signal sources and the area can be associated by the smartphone 18 to identify the current location. Depending on the coverage ranges and placed locations, the radio coverage of the signal sources C100 through C162 may or may not overlap one another, and may partially or fully overlap one another. For example, the coverage C120 and C122 of the WiFi AP 120 and the Bluetooth device 122 are partially overlapped. Because the signal sources are short-ranged, the location determined by the detected signal sources is accurate to the range of the radio coverage. For example, the radio coverage C122 of the Bluetooth device 122 is limited in a room of the building 12, therefore, when the signals of the Bluetooth device 122 is detected, the smartphone 18 can determine that its current location is in the room of the building 12.

The smartphone 18 can maintain a local Points of Interests (POI) database (location log) to manage a number of Points of Interests. The local POI database may be implemented in forms of a lookup table, a log, a database, or machine-searchable files. When the smartphone 18 enters into a new place and scans for radio frequency (RF) signals in the range to detect one or more signal sources (first signal sources), the user of the smartphone 18 may find the place is useful or interesting and record the place as a POI on the smartphone 18. The user may record the POI by launching a location application on the mobile platform of the smartphone 18 and enter a logging request. Upon receiving the logging request, the smartphone 18 can associate the POI and the detected signal sources by recoding a location identifier of the POI and information (first signal source information) on the detected signal sources in a location log. The location identifier represents the POI, and may be entered by the user or automatically generated by the location application. In some embodiments, the smartphone 18 generates the location identifier based on the device identifiers of the information about the detected signal sources. The information on the detected signal sources may vary based on the type of the signal source, including device identifiers, addresses, and signal strengths of the detected signal sources. For example, when the detected signal source is a WiFi AP, the information on the detected signal source contain an identifier, a media access control (MAC) address, and a received signal strength indicator (RSSI) (signal strength) of the WiFi AP. When the detected signal source is a Bluetooth device, the information on the detected signal source include a Bluetooth identifier, a Bluetooth address, and a Bluetooth RSSI (signal strength) of the Bluetooth device. When the detected signal source is an AP of a small cell such as a picocell or a femtocell, the information on the detected signal source include a cell identifier and a RSSI (signal strength) of the small cell.

The smartphone 18 can identify its current location by scanning the surrounding area and searching for a matched result of the scan information from the local POI database. The smartphone 18 may scan its surrounding area regularly for detecting RF signals of signal sources in the range. When an RF signal (second RF signal) of a signal source (second signal source) is detected, the smartphone can process, decode, and analyze the RF signal to obtain information on the signal sources, which include device identifiers, addresses, and signal strengths as in the POI collecting operation. Subsequently, the smartphone 18 can compare the scan information with those in the local POI database to determine a location of the smartphone 18. The smartphone 18 can compare currently scanned information with the POI information stored in the local POI database and based on a matched result to determine a coarse location of the smartphone 18. The matched result may be fully or partially matched with the currently information. For example, the current information may match to the POI information on the first WiFi identifier and the first MAC address but not the signal strength, the smartphone 18 may determine this as a partially matched result and regard the associated location identifier of the partially matched POI information as the current location of the smartphone 18. In another example, the current information may match to the POI information on all data of WiFi APs but a Bluetooth device is absent from the current information, the smartphone 18 may determine this as a partially matched result and regard the associated location identifier of the partially matched POI information as the current location of the smartphone 18.

As shown in FIG. 1, a user carries the smartphone 18 and walks into a shop in the building 12. As the user enters into the shop, the smartphone 18 scans for the RF signals in the range, detects the RF signals of the WiFi AP 120 and Bluetooth device 122, and obtain the information on the WiFi AP 120 and Bluetooth device 122 based on the detected RF signals. The user may enter a logging request to the location application on the smartphone 18, thereby storing a location identifier and the information on the WiFi AP 120 and Bluetooth device 122 in the local POI database. The location application may operate on the smartphone 18 upon system startup or user initiation. When the user revisits the shop in the building 12, the smartphone once again scans for the RF signals in the range, detects the RF signals of the WiFi AP 120 and Bluetooth device 122, and obtain the information on the WiFi AP 120 and Bluetooth device 122. The location application can compare the new information with all POI information in the local POI database, and determine the location identifier of a POI as a current location of the smartphone 18 when the new information match with the POI information of the POI in the local POI database. The smartphone 18 may display the current location of the smartphone 18 on the screen, or automatically perform a LBS task according to the current location.

Figure 2:
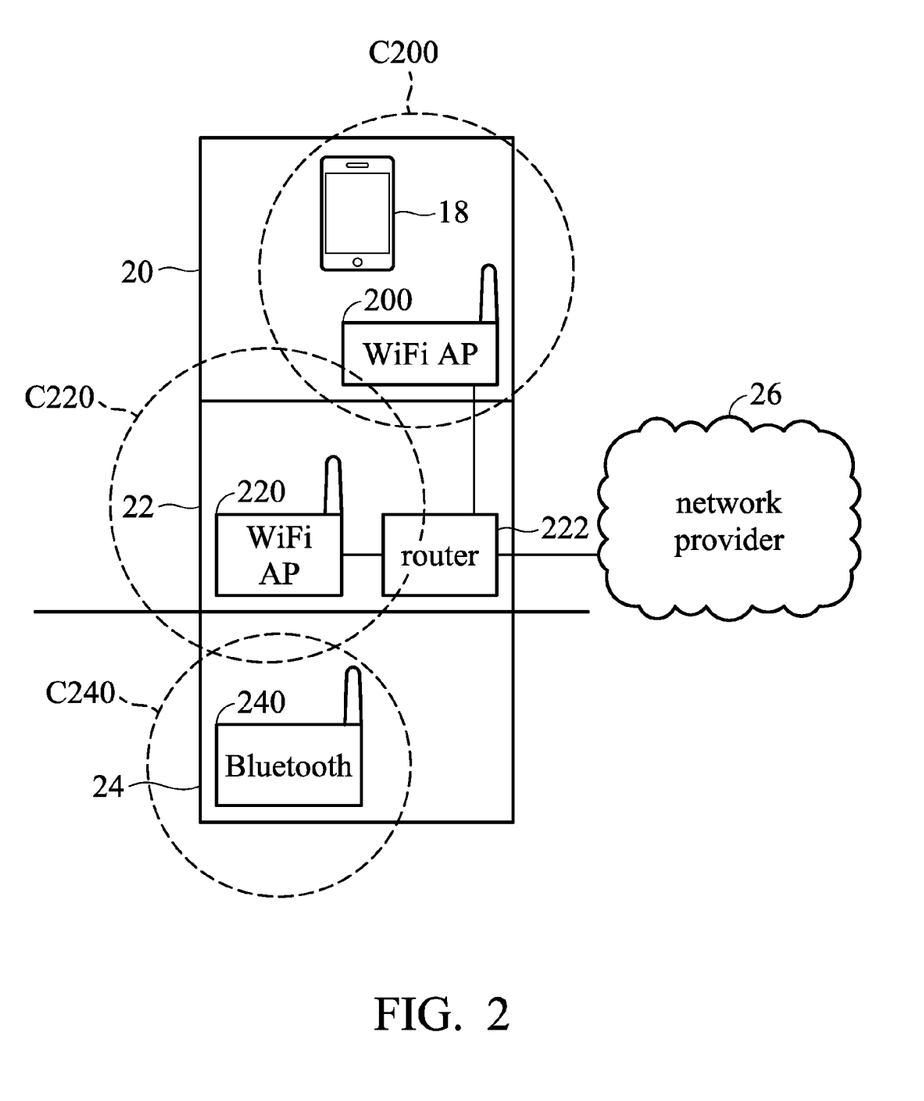
FIG. 2 is a schematic diagram illustrating locating operations of the smartphone 18 according to another embodiment of the invention.

FIG. 2 is a schematic diagram illustrating locating operations of the smartphone 18 in a home environment according to another embodiment of the invention. The smartphone 18 not only may determine a horizontal location but also a vertical location.

FIG. 2 shows a cross-sectional view of a building including 2 overground stories 20 and 22 and 1 underground basement 24. Each story and basement contains a signal source to provide wireless connections. The top story 20 includes a WiFi AP 200 with the radio coverage C200, the ground story 22 includes a WiFi AP 220 with the radio coverage C220, and the basement story includes a Bluetooth device 240 with the radio coverage C240. The WiFi APs 200 and 220 may connect to a network provider 26 through a router 222.

Accordingly, the smartphone 18 can determine its current position by scanning for signal sources in the surrounding area and searching for a matched result of the scan information from the local POI database. The user may enter the signal source information at the stories 20, 22, and the basement 24 to build the POI database in advance. As the user goes into the top story 20, the smartphone 18 scans for the RF signals in the range, detects the RF signals of the WiFi AP 200, and obtain the information on the WiFi AP 200 based on the detected RF signals. The location application can compare the new information with all POI information in the local POI database, and determine the location identifier of the top story as the current location of the smartphone 18 when the new information match with the POI information of the POI in the local POI database. The smartphone 18 may display the current location of the smartphone 18 on the screen, or automatically perform a LBS task according to the current location.

Figure 3:
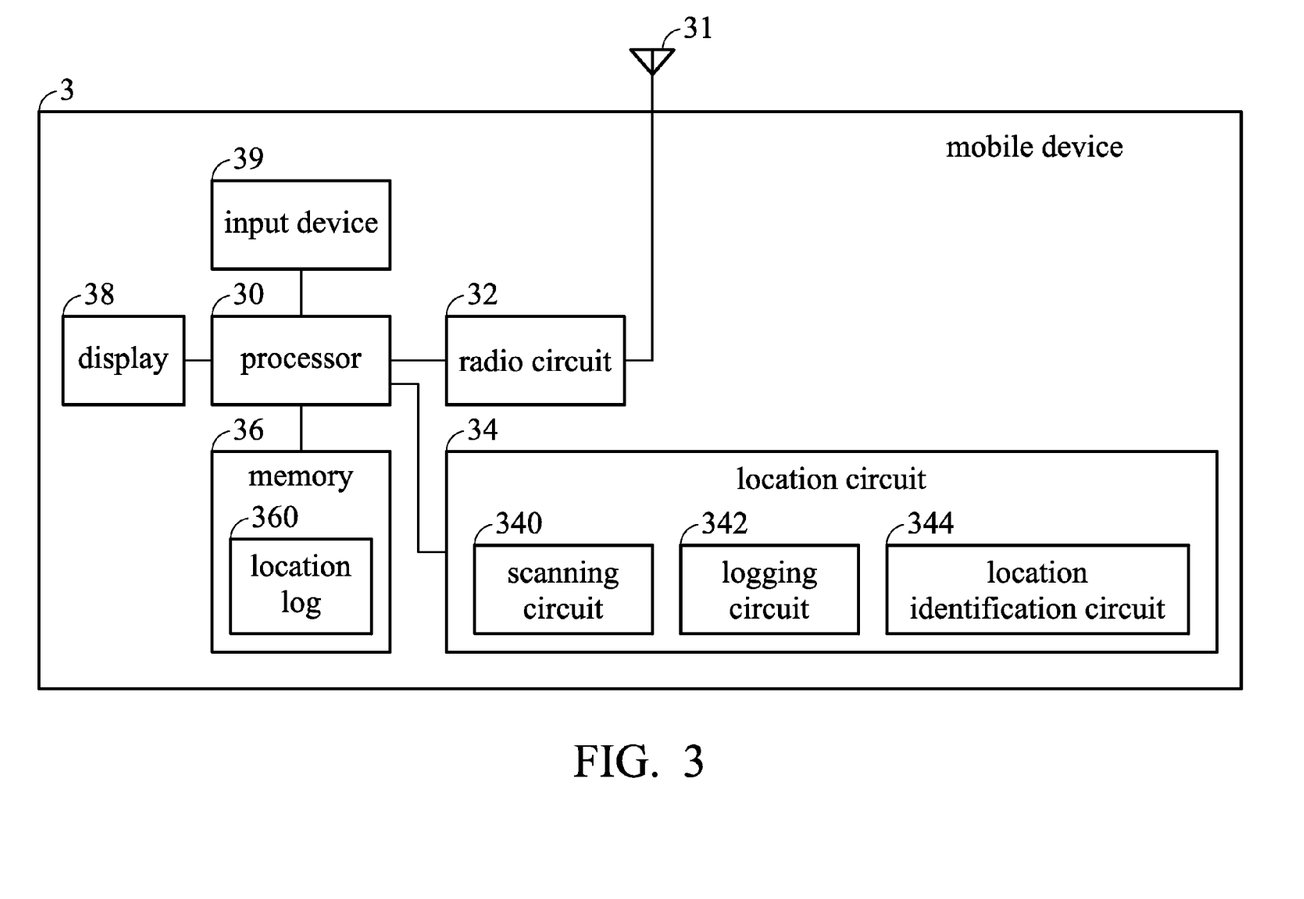
FIG. 3 is a block diagram of a mobile device 3 according to an embodiment of the invention.

342 is configured to record a first location identifier and the first signal source information in a location log, wherein the first location identifier represents the first location. The input interface may be implemented in the logging procedure or circuit 342. In one embodiment, the input interface is configured to display a text entry field on the display device 38 for the user to enter a desired location identifier (ID) of the POI.

The location log stored in the memory device 36 may be embodied as the following Table 1:

TABLE 1

| Location ID | WiFi information | | Bluetooth information | Small cell information |
|---|---|---|---|---|
| A | WiFi_AP_0; RSSI = −70 | mac=aa:bb:cc:dd:ee:f0; | BT_device_0; BT_addr=xxxxxx:yy:zzz0; RSSI = −70 | N/A |
| | WiFi_AP_1; RSSI = −80 | mac=aa:bb:cc:dd:ee:f1; | | |
| | WiFi_AP_2; RSSI = −90 | mac=aa:bb:cc:dd:ee:f2; | | |
| | WiFi_AP_3; RSSI = −80 | mac=aa:bb:cc:dd:ee:f3; | | |
| B | WiFi_AP_4; RSSI = −70 | mac=aa:bb:cc:dd:ee:f4; | BT_device_1; BT_addr=xxxxxx:yy:zzz1; RSSI = −80 | N/A |
| | WiFi_AP_5; RSSI = −80 | mac=aa:bb:cc:dd:ee:f5; | | |

The smartphone 18 in FIGS. 1 and 2 employs the local POI database and the signal source information of the detected signal sources in the surrounding area to determine its current location, horizontally or vertically, without the use of a GPS, AGPS, or remote positioning server to identify the location, identifying the current location and providing LBS while preserving user privacy.

FIG. 3 is a block diagram of a mobile device 3 according to an embodiment of the invention, containing a processor 30, a radio circuit 32, an antenna 31, a location procedure or circuit 34, a memory device 36, a display device 38 and an input device 39. The mobile device 3 may be used as the smartphone 18 in FIGS. 1 and 2.

The location procedure or circuit 34 is configured to automatically determine a current location of the mobile device 3 by the location identification operation described in the preceding sections. The location procedure or circuit 34 may be embodied as executable codes that are resident in the memory device 36 and executed by the processor 30, or a hardware circuit which performs the operation. When being implemented as executable codes, the location procedure or circuit 34 may be the location application operating on the smartphone 18. The location procedure or circuit 34 includes a scanning procedure or circuit 340, a logging procedure or circuit 342 and a location identification procedure or circuit 344.

The scanning procedure or circuit 340 and the logging procedure or circuit 342 are utilized to build, construct, and/or manage a location log, which may be stored in the memory device 36. The scanning procedure or circuit 340 is configured to scan for RF signals of signal sources in the vicinity of a first location to obtain the first signal source information. The scanning procedure or circuit 340 may perform a radio scan periodically for monitoring RF signals emitted by WiFi devices, Bluetooth devices, and small cell base stations in the vicinity. The radio scan for all types of the signal sources may be performed sequentially or concurrently. The logging procedure or circuit 342 is configured to receive a logging request from an input interface to log the first location. Upon receiving the logging request, the logging procedure or circuit The location log includes two location entries: Location A and Location B. Location A includes 4 WiFi signal sources and 1 Bluetooth signal source; and Location B includes 2 WiFi signal sources and 1 Bluetooth signal source. Each signal source contains information of the device ID, the device address, and the received signal strength. For example, WiFi information "WiFi_AP_0; mac=aa:bb:cc:dd:ee:f0; RSSI=−70" indicates that a WiFi AP has a device ID of WiFi_AP_0, an MAC address of aa:bb:cc:dd:ee:f0, and a received signal strength indicator of −70 dB.

The scanning procedure or circuit 340 and location identification procedure or circuit 344 serve to identify the location of the mobile device 3. Accordingly, the scanning procedure or circuit 340 is configured to scan for RF signals of signal sources in a vicinity periodically. Thus, when the user brings the wireless device 3 to the same first location, the scanning procedure or circuit 340 will scan the first location to obtain second signal source information. Subsequently, the location identification procedure or circuit 344 is configured to compare the second signal source information with the first signal source information in the location log, and determine the first location identifier as a current location of the mobile device 3 when the second signal source information match with the first signal source information in the location log. The display device 38 may show the current location thereon. The mobile device 3 may do nothing when there is no match in the location log.

The radio circuit 32 includes a transceiver circuit for transmitting and receiving RF signals via the antenna 31. The detecting of the RF signals of nearby signal sources are performed by the radio circuit 32 and the antenna 31. The signal strength such as RSSI may be measured and computed by a computation circuit (not shown) in the radio circuit 32. The transceiver circuit may be configured to communicate in a radio access network and/or local area network and/or point-to-point connection, but are not limited to, Bluetooth, WiFi, Wireless Local Area Network (WLAN), Global System for Mobile Communications (GSM), General packet radio service (GPRS), Enhanced Data rates for GSM Evolution (EDGE), Universal Mobile Telecommunications System (UMTS), Code Division Multiple Access 2000 (CDMA2000), Enhanced Voice-Data Optimized (EVDO), High Speed Packet Access (HSPA), HSPA plus (GSPA+), Time Division-Synchronous Code Division Multiple Access (TD-SCDMA), Worldwide Interoperability for Microwave Access (WiMAX), Long Term Evolution (LTE), and LTE-Advanced (LTE-A) systems.

The display device 38 may be a LCD panel, a touch panel, or a projection device. The input device 39 may be a keyboard, a mouse, or a touch panel. In some embodiments, a touch panel may be used to implement the display device 38 and input device 39.

The mobile device 3 employs the local POI database and the signal source information of the detected signal sources in the neighboring area to determine its current location, horizontally or vertically, without the use of an external positioning server or cloud server to identify the location, identifying the current location and providing LBS while preserving user privacy.

Figure 4:
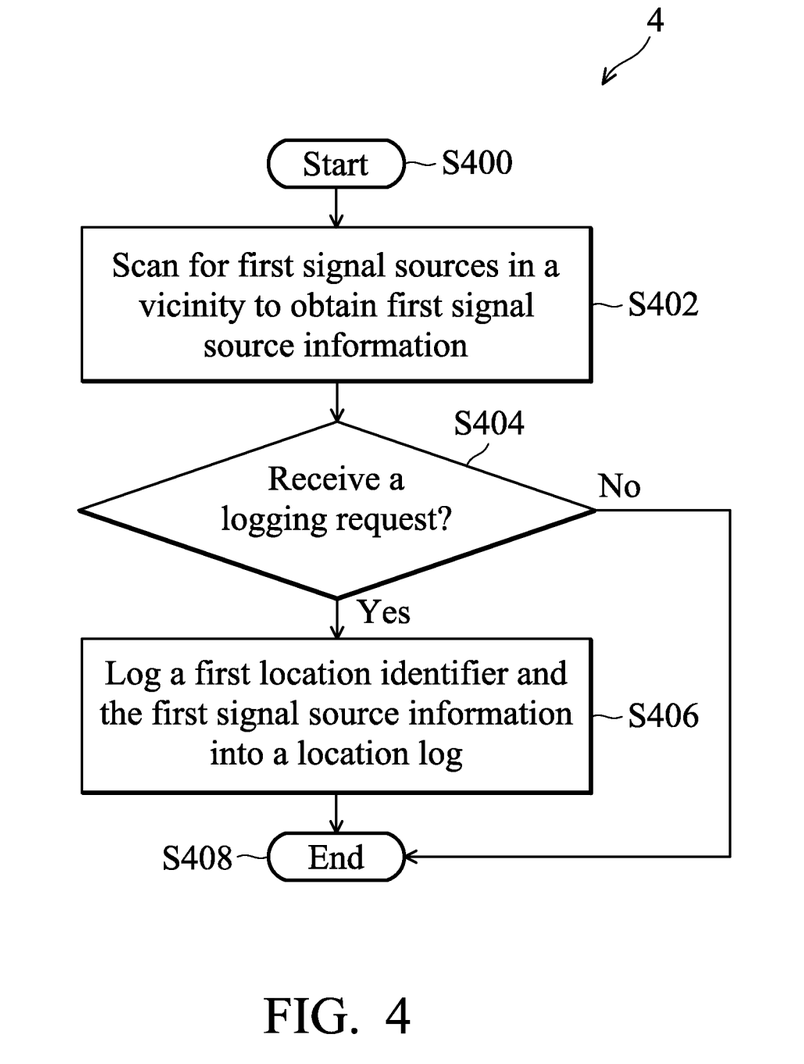
FIG. 4 is a flowchart of a location logging method 4 according to an embodiment of the invention.

FIG. 4 is a flowchart of a location logging method 4 according to an embodiment of the invention, incorporating the mobile device 3 in FIG. 3. The location logging method 4, which constructs and manages a location log in the mobile device 3, may be implemented by executable codes executable by the processor 300 or hardware circuits performing the following steps.

The location logging method 4 may be initiated upon system startup or launched by a user on the mobile platform of the mobile device 3 (S400). Upon startup, the location logging method 4 scans for RF signals of first signal sources in a vicinity of a first location to obtain first signal source information (S402). The mobile device 3 may detect more than one signal source as the first signal source. The first radio signal sources are short-ranged RF signal sources which have the coverage range less than 200 meters, and may be a WiFi, Bluetooth, or small cell AP. The first signal source information are associated with each detected signal source, including the device ID, the device address, and the signal strength. When the detected signal source is a WiFi AP, the first signal source information include a WiFi identifier, a MAC address, and a RSSI. When the detected signal source is a Bluetooth device, the first signal source information include a Bluetooth identifier, a Bluetooth address, and a Bluetooth RSSI. When the detected signal source is an AP of a small cell such as a picocell or a femtocell, the information on the detected signal source include a cell identifier and a RSSI.

The location logging method 4 then determines whether a logging request has been received from the input interface on the mobile device 3 (S404), record a first location identifier and the first signal source information into the location log when the logging request has been received (S406), and exits the procedure when no logging request has been detected (S408). The first location identifier represents the first location where the mobile device 3 is current in, and may be included in the logging request, or automatically generated by the system.

The location logging method 4 builds a local location log in the mobile device 3 without uploading location information of the mobile device 3 to an external positioning server or cloud server, maintaining a list of locations of interest while providing user privacy.

Figure 5:
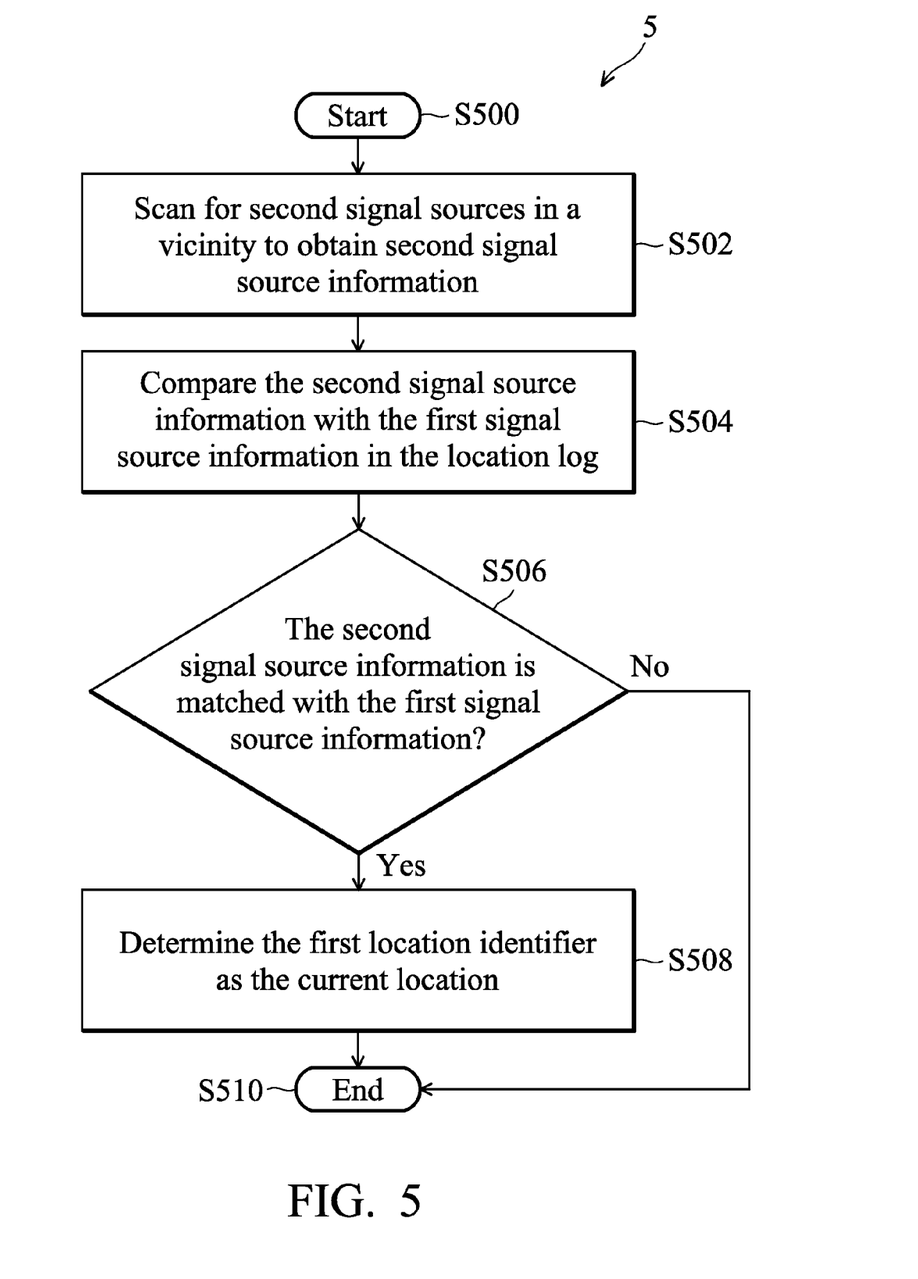
FIG. 5 is a flowchart of a location identification method 5 according to an embodiment of the invention.

FIG. 5 is a flowchart of a location identification method 5 according to an embodiment of the invention, incorporating the mobile device 3 in FIG. 3. The location identification method 5, which identifies a current location of the mobile device 3 based on the location log and scan result, may be implemented by executable codes executable by the processor 300 or hardware circuits performing the following steps.

The location identification method 5 may be initiated upon system startup or launched by a user on the mobile platform of the mobile device 3 (S500). Upon startup, the location identification method 5 scans for RF signals of second signal sources in a vicinity of the first location to obtain second signal source information (S502). The second signal source information may be fully matched, partially matched or containing no match with the signal source information previously collected and stored in the location log.

The location identification method 5 then compares the second signal source information with the first signal source information in the location log (S504) and determines whether the second signal source information match with the first signal source information (S506). When the second signal source information is partially or fully matched with the first signal source information, the location identification method 5 determine the first location identifier associated with the first signal source information as the current location of the mobile device 3 (S508). When the second signal source information contain no match to the first signal source information, the location identification method 5 is exited and completed (S510).

The location identification method 5 identifies the location of the mobile device 3 by a local location log in the mobile device 3, providing LBS while preserving user privacy.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, micro controller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method, adopted by a mobile device, comprising:
  scanning radio frequency (RF) signals of at least one signal source in a vicinity of a first location to obtain first signal source information at a first time point, wherein the first signal source information comprises at least a type and a signal strength of at least one signal source;
  receiving a logging request entered by a user of the mobile device to log information about the first location;

upon receiving the logging request, recording a first location identifier and the first signal source information in a location log to show that the first signal source information is associated with the first location identifier, wherein the first location identifier represents the first location;

scanning radio frequency signals to obtain second signal source information at a second time point, wherein the second signal source information comprises at least a type and a signal strength of at least one signal source;

comparing the second signal source information with the first signal source information in the location log; and determining the first location identifier as a current location of the mobile device when the second signal source information is the same as the first signal source information in the location log; and displaying the current location of the mobile device on a screen of the mobile device or displaying advertising on the screen of the mobile device based on the current location.

2. The method of claim 1, wherein the signal source comprises a wireless access point, the first signal source information further comprises an identifier and a media access control (MAC) address, and when the content of the second signal source information is the same as the part of content of the first signal source information in the location log, the first location identifier is determined as the current location of the mobile device.

3. The method of claim 1, wherein the signal source comprises a Bluetooth device, the first signal source information further comprises a Bluetooth identifier and a Bluetooth address, and when the content of the second signal source information is the same as the part of content of the first signal source information in the location log, the first location identifier is determined as the current location of the mobile device.

4. The method of claim 1, wherein the signal source comprises a small cell, the first signal source information further comprises a cell identifier, and when the content of the second signal source information is the same as the part of content of the first signal source information in the location log, the first location identifier is determined as the current location of the mobile device.

5. A mobile device, comprising:
a screen;
a scanning circuit, configured to scan RF signals of at least one signal source in a vicinity of a first location to obtain first signal source information at a first time point, wherein the first signal source information comprises at least a type and a signal strength of at least one signal source;
a logging circuit, configured to receive a logging request entered by a user of the mobile device to log information about the first location, and upon receiving the logging request, record a first location identifier and the first signal source information in a location log to show that the first signal source information is associated with the first location identifier, wherein the first location identifier represents the first location;
a memory, configured to store the location log; and
a location identification circuit,
wherein the scanning circuit scans RF signals to obtain second signal source information at a second time point, and the second signal source information comprises at least a type and a signal strength of at least one signal source, and the location identification circuit determines the first location identifier as a current location of the mobile device when the second signal source information is the same as the first signal source information in the location log; and
wherein the current location of the mobile device is displayed on the screen or advertising is displayed on the screen based on the current location.

6. The mobile device of claim 5, wherein the signal source comprises a wireless access point, the first signal source information further comprises an identifier and a media access control (MAC) address, and when the content of the second signal source information is the same as the part of content of the first signal source information in the location log, the first location identifier is determined as the current location of the mobile device.

7. The mobile device of claim 5, wherein the signal source comprises a Bluetooth device, the first signal source information further comprises a Bluetooth identifier and a Bluetooth address, and when the content of the second signal source information is the same as the part of content of the first signal source information in the location log, the first location identifier is determined as the current location of the mobile device.

8. The mobile device of claim 5, wherein the signal source comprises a small cell, the first signal source information further comprises a cell identifier, and when the content of the second signal source information is the same as the part of content of the first signal source information in the location log, the first location identifier is determined as the current location of the mobile device.

* * * * *